US009882959B2

(12) United States Patent
Chow et al.

(10) Patent No.: US 9,882,959 B2
(45) Date of Patent: Jan. 30, 2018

(54) MANAGING REQUESTS TO A HIGH UTILIZATION WEBSITE

(71) Applicant: International Business Machines Corporation, Armonk, NY (US)

(72) Inventors: Stephen Chow, Plano, TX (US); Grant D. Miller, Arvada, CO (US); Nader M. Nassar, Yorktown Heights, NY (US); Richard J. Newhook, West Chester, PA (US); Erich Walls, Valparaiso, IN (US)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 14/502,364

(22) Filed: Sep. 30, 2014

(65) Prior Publication Data

US 2016/0094611 A1    Mar. 31, 2016

(51) Int. Cl.
*G06F 15/16* (2006.01)
*H04L 29/08* (2006.01)
*H04L 29/06* (2006.01)

(52) U.S. Cl.
CPC ............ *H04L 67/02* (2013.01); *H04L 67/06* (2013.01); *H04L 67/2804* (2013.01);
(Continued)

(58) Field of Classification Search
CPC ..... H04L 29/06; H04L 67/06; H04L 67/2804; H04L 67/2861; H04L 67/2819; H04L 67/02
See application file for complete search history.

(56) References Cited

U.S. PATENT DOCUMENTS 6,772,202 B2    8/2004  Wright
8,521,891 B1 *  8/2013  Shinde .............. G06F 17/30902
                                                       709/206

(Continued)

FOREIGN PATENT DOCUMENTS

CN       102170400 A       8/2011
EP         1662715 A1      5/2006
(Continued)

OTHER PUBLICATIONS

IBM, "Method and System to Manage Web Site Peak Workload Based on Resource Aware Active User Control and Client Server Collaboration", IPCOM000184975D, Jul. 7, 2009.

*Primary Examiner* — Philip Chea
*Assistant Examiner* — Mohammed Ahmed
(74) *Attorney, Agent, or Firm* — Daniel R. Simek (57) ABSTRACT

In an approach to managing requests to a high utilization website, one or more computer processors receive a first resource usage load status from a first server computer. The one or more computer processors receive a request for content on the first server computer from a client. The one or more computer processors determine whether the first resource usage load is above a pre-defined threshold. Responsive to determining the first resource usage load is above the pre-defined threshold, the one or more computer processors create a queue of a plurality of content requesters, wherein the client is one of the plurality of content requesters. The one or more computer processors establish a bidirectional communication channel with the client.

17 Claims, 4 Drawing Sheets

(52) U.S. Cl.
CPC ........ *H04L 67/2814* (2013.01); *H04L 67/322* (2013.01); *H04L 29/06* (2013.01)

(56) References Cited

U.S. PATENT DOCUMENTS

| | | | | |
|---|---|---|---|---|
| 2003/0099197 | A1* | 5/2003 | Yokota | H04L 12/5695 370/230 |
| 2003/0101213 | A1* | 5/2003 | Wright | H04L 29/06 709/203 |
| 2010/0306547 | A1* | 12/2010 | Fallows | G06F 21/305 713/178 |
| 2012/0151068 | A1* | 6/2012 | Su | H04L 43/10 709/227 |
| 2013/0252583 | A1* | 9/2013 | Brown | H04W 12/06 455/411 |
| 2013/0290516 | A1* | 10/2013 | Eaton | G06F 17/3089 709/224 |
| 2014/0095874 | A1* | 4/2014 | Desai | H04L 63/0815 713/168 |
| 2015/0180748 | A1* | 6/2015 | Ding | H04L 41/046 709/224 |
| 2016/0057233 | A1* | 2/2016 | Scoda | H04L 67/146 709/227 |

FOREIGN PATENT DOCUMENTS

| | | | |
|---|---|---|---|
| WO | 2002021773 | A3 | 8/2002 |
| WO | 2002067513 | A1 | 8/2002 |
| WO | 2004034731 | A1 | 4/2004 |
| WO | 2004015520 | A3 | 11/2004 |
| WO | 2006093619 | A2 | 9/2006 |

\* cited by examiner

MANAGING REQUESTS TO A HIGH UTILIZATION WEBSITE

BACKGROUND OF THE INVENTION

The present invention relates generally to the field of electronic data transfer, and more particularly to managing requests to a high utilization website.

The ability to effectively transfer electronic information over a data network is often highly dependent on the amount of resources available to the host that provides the information. For example, in the area of Internet content delivery, the ability of a network server to provide data (such as files, e-mail, and streaming media) to a large number of clients can be affected by the resource limitations of the host on which the server resides. Such resource limitations typically include, but are not limited to, network bandwidth, host processing power or CPU, available memory, file and/or socket descriptors, and disk input/output bandwidth. As the number of clients requesting files or other content from a particular server increases, one or more of these resources can eventually become exhausted.

Conventional network servers typically exhibit one or more of the following behaviors as their resources near exhaustion: (1) additional clients are completely denied access, either with a standard error message/protocol or simply through the inability to complete a transaction; (2) additional clients are served, but the performance for all clients accessing the host degrades, often creating a "snowball" effect whereby performance eventually reaches zero for all clients as resources are completely exhausted; and/or (3) the host is shut down or "crashes" because a key resource is exhausted. These behaviors are undesirable for client users as well as for hosts, and often impair the ability of any user to receive content during peak demand periods. This impairment is exacerbated by the fact that conventional clients, such as conventional web browsers, are programmed to continually retry their requests, which puts additional strain on the network server and can lead to further resource exhaustion.

SUMMARY

Embodiments of the present invention disclose a method, a computer program product, and a system for managing requests to a high utilization website. The method for managing requests to a high utilization website can include one or more computer processors receiving a first resource usage load status from a first server computer. The one or more computer processors receive a request for content on the first server computer from a client. The one or more computer processors determine whether the first resource usage load is above a pre-defined threshold. Responsive to determining the first resource usage load is above the pre-defined threshold, the one or more computer processors create a queue of a plurality of content requesters, wherein the client is one of the plurality of content requesters. The one or more computer processors establish a bidirectional communication channel with the client.

DETAILED DESCRIPTION

Host machines, such as servers, that provide content over the Internet often experience short but critical "peak" usage periods after new content is released during which a large number of users simultaneously attempt to download content from the server. Often, there is no way to make enough resources available to the server to service the numerous data requests received during those peak periods. When denied access to the server, users often continually retransmit their requests. As server resources become available, a conventional server provides the resources to the first user request received, irrespective of how long the user that made the request has been attempting to access the server. If the website is under extreme load, having a large pool of waiting users continually checking for availability of the server can generate a large amount of traffic and consume resources on the server. The continual checking can keep the server at a high resource load far beyond the initial high demand event.

Embodiments of the present invention recognize that management of requests made to high utilization websites, or websites experiencing peak usage periods, can be improved by introducing a slow trickle data communications path into the web page request life cycle that creates a user queue and manages the user experience. Implementation of embodiments of the invention can take a variety of forms, and exemplary implementation details are discussed subsequently with reference to the Figures.

Figure 1:
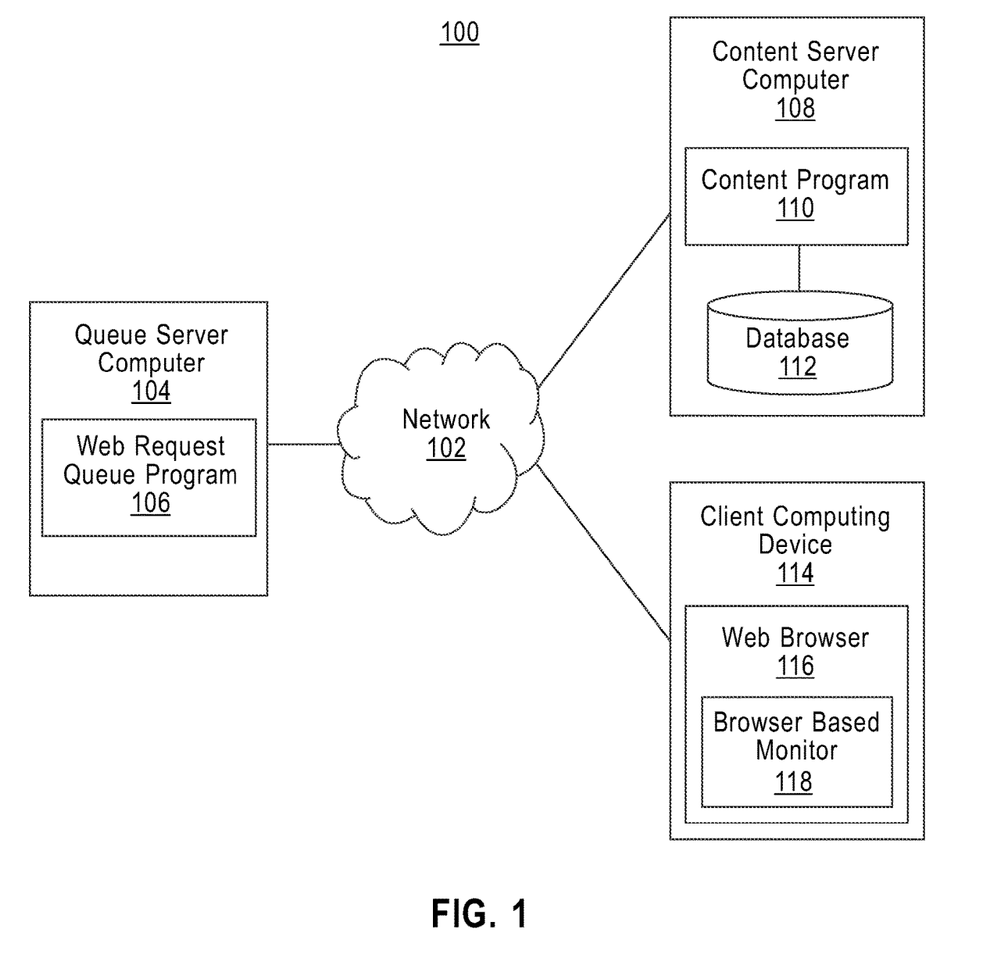
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments can be implemented. Many modifications to the depicted environment can be made by those skilled in the art without departing from the scope of the invention as recited by the claims.

Distributed data processing environment 100 includes queue server computer 104, content server computer 108, and client computing device 114, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information.

Queue server computer 104 can be a management server, a web server, or any other electronic device or computing system capable of receiving and sending data. In other embodiments, queue server computer 104 can represent a server computing system utilizing multiple computers as a server system, such as in a cloud computing environment. In another embodiment, queue server computer 104 can be a laptop computer, a tablet computer, a netbook computer, a personal computer (PC), a desktop computer, a personal digital assistant (PDA), a smart phone, or any programmable electronic device capable of communicating with content server computer 108 and client computing device 114 via network 102. In another embodiment, queue server computer 104 represents a computing system utilizing clustered computers and components to act as a single pool of seamless resources. Queue server computer 104 acts as the designated point of contact for a website, typically as the "home uniform resource locator (URL)". User requests for a website are initially sent to queue server computer 104. In one embodiment, queue server computer 104 and content server computer 108 are physically separate devices. In another embodiment, the capabilities of queue server computer 104 and content server computer 108 can co-reside in one device. Queue server computer 104 includes web request queue program 106.

Web request queue program 106 manages requests for web content from users to a high utilization website. Web request queue program 106 receives a request for web content from a user and determines if the resources of content server computer 108 are above a usage threshold and are therefore constrained. In various embodiments, a system administrator pre-defines the usage threshold. The usage threshold refers to one or more measureable indicators of load, for example, CPU usage percentage. If the resources of content server computer 108 are constrained, then web request queue program 106 begins a queue of users requesting web content, and advises the users of a position in the queue. As the resources of content server computer 108 become available, web request queue program 106 provides an access token to the user such that the requested web content can be retrieved from content server computer 108. An access token contains security credentials for a login session and can identify the user, the user's groups, the user's privileges, and, in some cases, a particular application. Web request queue program 106 is depicted and described in further detail with respect to FIG. 2.

Content server computer 108 can be a management server, a web server, or any other electronic device or computing system capable of receiving and sending data. In other embodiments, content server computer 108 can represent a server computing system utilizing multiple computers as a server system, such as in a cloud computing environment. In another embodiment, content server computer 108 can be a laptop computer, a tablet computer, a netbook computer, a personal computer (PC), a desktop computer, a personal digital assistant (PDA), a smart phone, or any programmable electronic device capable of communicating with queue server computer 104 and client computing device 114 via network 102. In another embodiment, content server computer 108 represents a computing system utilizing clustered computers and components to act as a single pool of seamless resources. Content server computer 108 acts as a website's processing unit, servicing user transactions and delivering both static and dynamic web content. Content server computer 108 includes content program 110 and database 112.

Content program 110 delivers requested web content to a user. Content program 110 receives a request for web content from a user when web request queue program 106 determines resources of content server computer 108 are available. Content program 110 determines whether a received access token is valid, and if so, delivers the web content to the user. Content program 110 is depicted and described in further detail with respect to FIG. 3.

Database 112 resides on content server computer 108. In another embodiment, database 112 can reside on queue server computer 104, or elsewhere in the environment. A database is an organized collection of data. Database 112 can be implemented with any type of storage device capable of storing data that can be accessed and utilized by content server computer 108, such as a database server, a hard disk drive, or a flash memory. In other embodiments, database 112 can represent multiple storage devices within content server computer 108. Database 112 stores active tokens received from queue server computer 104. One-time access tokens received from queue server computer 104 enable content program 110 to deliver web content to users in the queue.

Client computing device 114 can be a desktop computer, a laptop computer, a tablet computer, a specialized computer server, a smart phone, or any programmable electronic device capable of communicating with queue server computer 104 and content server computer 108 via network 102 and with various components and devices within distributed data processing environment 100. In general, client computing device 114 represents any programmable electronic device or combination of programmable electronic devices capable of executing machine readable program instructions and communicating with other computing devices via a network, such as network 102. Client computing device 114 includes web browser 116.

Web browser 116 resides on client computing device 114. A web browser is a software application for retrieving, presenting, and traversing information resources on the World Wide Web. Although web browsers are primarily intended to use the World Wide Web, they can also be used to access information provided by web servers in private networks, including intranets, or files in file systems. A web browser may use a web user interface (WUI) to display text, documents, web browser windows, user options, application interfaces, and instructions for operation. When the user of client computing device 114 requests web content from a high utilization web site that manages resource loads with web request queue program 106, web browser 116 includes browser based monitor 118.

Browser based monitor 118 is a component or library that acts as a manager for web clients during a web, or bandwidth, throttling process. Browser based monitor 118 can be, for example, a JavaScript® module. JavaScript® is an interpreted computer programming language. The most common use of JavaScript® is to write functions that are embedded in or included within HyperText Markup Language (HTML) web pages. JavaScript® provides the tools to manipulate the objects in a web page. Bandwidth throttling is often used in Internet applications, in order to spread a load over a wider network to reduce local network congestion, or over a number of servers to avoid overloading individual ones, and so reduce the risk of crashing. Web browser 116 receives browser based monitor 118 from queue server computer 104. Browser based monitor 118 establishes a single, persistent WebSocket connection between web browser 116 and queue server computer 104. WebSocket is a protocol providing full-duplex communications channels over a single Transmission Control Protocol (TCP) connection. The WebSocket connection is bidirectional and queue server computer 104 uses the WebSocket connection as a conduit to continually update the user with the status of the throttling of the resources of content server computer 108.

Figure 2:
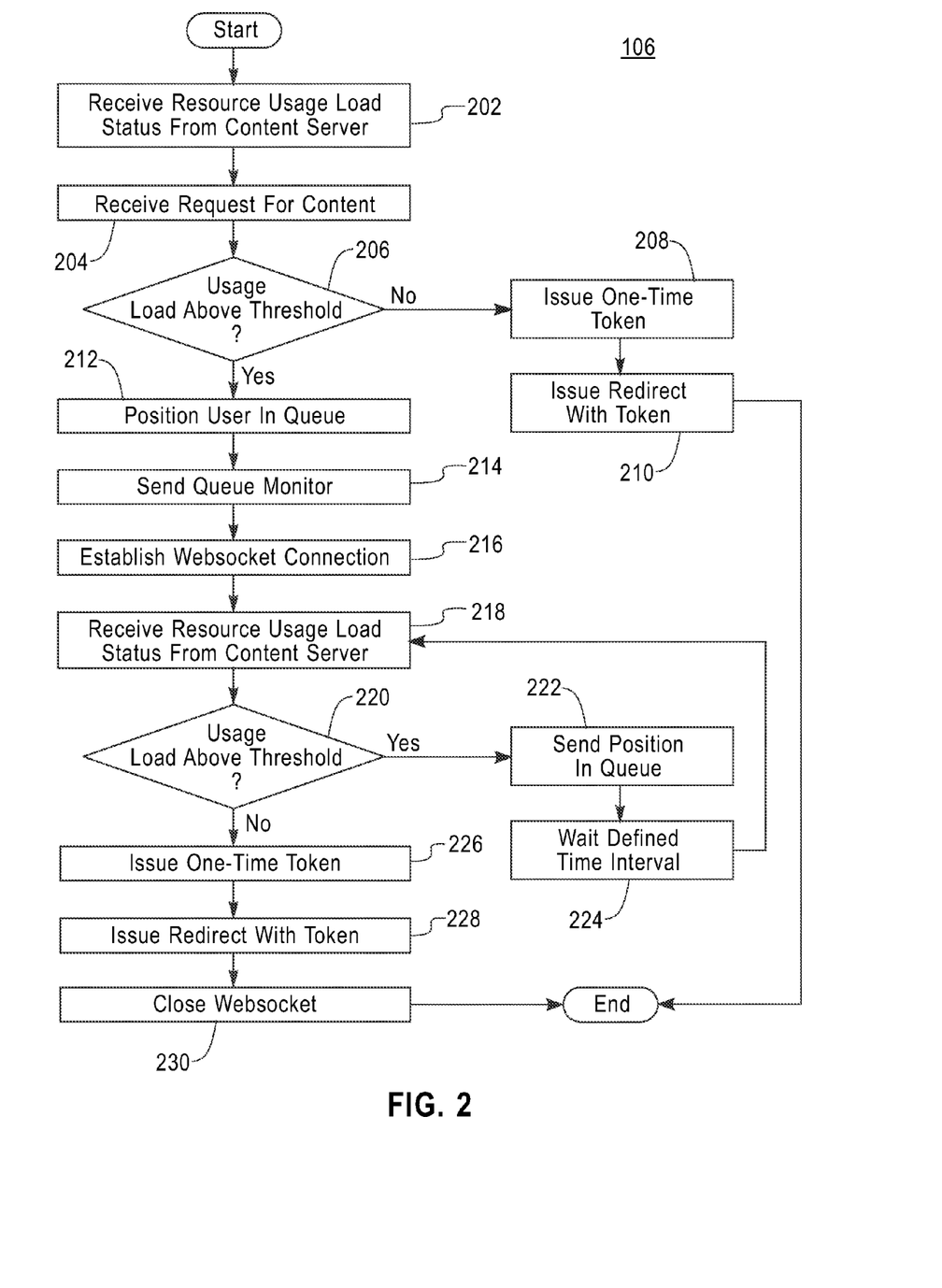
FIG. 2 is a flowchart depicting operational steps of a web request queue program, on a queue server computer within the distributed data processing environment of FIG. 1, for managing requests to a high utilization website, in accordance with an embodiment of the present invention.

FIG. 2 is a flowchart depicting operational steps of web request queue program 106, on queue server computer 104, within distributed data processing environment 100 of FIG. 1, for managing requests to a high utilization website, in accordance with an embodiment of the present invention.

Web request queue program 106 receives resource usage load status from content server computer 108 (step 202). At regular intervals, content server computer 108 sends a message to queue server computer 104 to inform queue server computer 104 of the current resource usage load. The intervals can be defined by the system administrator or as program defaults. Examples of measureable indicators of load include, but are not limited to, CPU usage percentage, network traffic saturation, and number of active requests.

Web request queue program 106 receives a request for web content from a user (step 204). The user's request for web content is a standard Hypertext Transfer Protocol (HTTP) request to the URL of queue server computer 104.

Web request queue program 106 determines whether the usage load of content server computer 108 is above a pre-defined threshold (decision block 206). The system designer or system administrator analyzes the physical system to determine the limitations or criteria that cause the system resources to be constrained and sets a threshold. The threshold is defined as a value of whatever measureable indicator is being used to measure the usage load of content server computer 108. The threshold value is a number at which the resources of content server computer 108 are constrained. If the usage load of content server computer 108 is not above the pre-defined threshold ("no" branch, decision block 206), then web request queue program 106 issues a one-time access token (step 208). The one-time access token allows the user to proceed with direct access to content server computer 108. Web request queue program 106 stores the one-time access token in database 112 for access by content program 110. Responsive to issuing the one-time access token, web request queue program 106 issues a redirect with the token (step 210). Issuing the redirect with the token re-loads the user's web page to the requested web content.

If the usage load of content server computer 108 is above the pre-defined threshold ("yes" branch, decision block 206), then web request queue program 106 positions the user in a queue (step 212). Web request queue program 106 addresses the high usage load on content server computer 108 by creating a queue for managed processing. The situation is synonymous to a large number of bank customers visiting a bank all at once when the bank only has ten tellers to serve the customers. The queue can be implemented in a plurality of forms. For example, the queue can be set up with a first-in, first-out model, maintaining a chronological order of user requests. In another example, users with special credentials, such as a membership, can be placed ahead of users without the special credentials in the queue.

Web request queue program 106 sends a queue monitor to the user (step 214). A queue monitor is a monitoring display that monitors the user's position in the queue and displays the position to the user. Responsive to positioning the user in the queue, web request queue program 106 sends the user a substitute web page of minimal data size, i.e. bytes, to alert the user that the request is in a queue. For example, the substitute web page can have a message such as "We are encountering a high load at this time. You are number X in the queue. Please do not reload this page." The message can also indicate that if the user reloads the page, the user is placed at the end of the queue. In addition to the substitute web page, the queue monitor includes browser based monitor 118.

Web request queue program 106 establishes a WebSocket connection (step 216). Web request queue program 106 establishes a WebSocket connection with web browser 116 on client computing device 114 via browser based monitor 118. The WebSocket connection allows two-way communication between web request queue program 106 and web browser 116.

Web request queue program 106 receives resource usage load status from content server computer 108 (step 218). As discussed above, content server computer 108 sends a message to queue server computer 104 at regular intervals regarding the resource usage load status of content server computer 108. In another embodiment, where web request queue program 106 has an urgent need to determine the resource usage load due to a high volume of requests, web request queue program 106 requests resource usage load status from content server computer 108 immediately instead of waiting for the status to arrive at the regular time interval.

Web request queue program 106 determines whether the usage load of content server computer 108 is above a pre-defined threshold (decision block 220). If web request queue program 106 determines the usage load of content server computer 108 is above a pre-defined threshold ("yes" branch, decision block 220), then web request queue program 106 sends the position in the queue (step 222). The WebSocket connection allows web request queue program 106 to send messages to the user at regular intervals. The interval is designed to be no more often than necessary to keep the WebSocket connection active. The message is designed to use only a small number of bytes. By keeping the interval and the message small, web request queue program 106 can maintain multiple active connections with little impact to server load. When the message arrives at web browser 116, browser based monitor 118 updates the display message, alerting the user to any change in the queue position. In one embodiment, browser based monitor 118 monitors whether the user attempts to perform a page refresh. If browser based monitor 118 detects a page refresh attempt, browser based monitor 118 displays a message to the user warning the user that refreshing the page can cause the user to lose the current position in the queue.

Web request queue program 106 waits for a defined time interval (step 224). As discussed above, web request queue program 106 waits for a defined period of time after sending the queue status to the user. In one embodiment, the defined time interval coincides with the time interval with which content server computer 108 sends resource usage load status updates, and after waiting for the defined time interval, web request queue program 106 returns to step 218 to receive the resource usage load status from content server computer 108. In another embodiment, where the defined period of time after sending the queue status to the user does not coincide with the time interval with which content server computer 108 sends resource usage load updates, web request queue program 106 may request the current resource usage load status from content server computer 108 after waiting the defined period of time. Responsive to receiving the usage load status, web request queue program 106 determines whether the resource usage load of content server computer 108 is above a pre-defined threshold (decision block 220).

If web request queue program 106 determines the usage load of content server computer 108 is not above a pre-defined threshold ("no" branch, decision block 220), then web request queue program 106 issues a one-time access token (step 226). As the resource usage load of content server computer 108 drops below the pre-defined threshold, web request queue program 106 retrieves the next waiting user from the queue. Web request queue program 106 issues a one-time access token and sends the token to content server computer 108 with a relatively short time duration for which the token is valid. Web request queue program 106 also sends the token to web browser 116 via the WebSocket connection. Responsive to issuing the one-time access token, web request queue program 106 issues a redirect with the token (step 228). Web request queue program 106 stores the one-time access token in database 112 for access by content program 110. The redirect includes both the token and a URL allowing direct access to content server computer 108. The redirect arrives at browser based monitor 118 which requests an immediate reload of the user's requested web content page using the supplied URL as the page address and embedding the token as an HTTP header value.

In one embodiment, responsive to issuing the redirect with the token, web request queue program 106 closes the WebSocket connection (step 230). In another embodiment, browser based monitor 118 closes the WebSocket connection upon receipt of the token from web request queue program 106.

Figure 3:
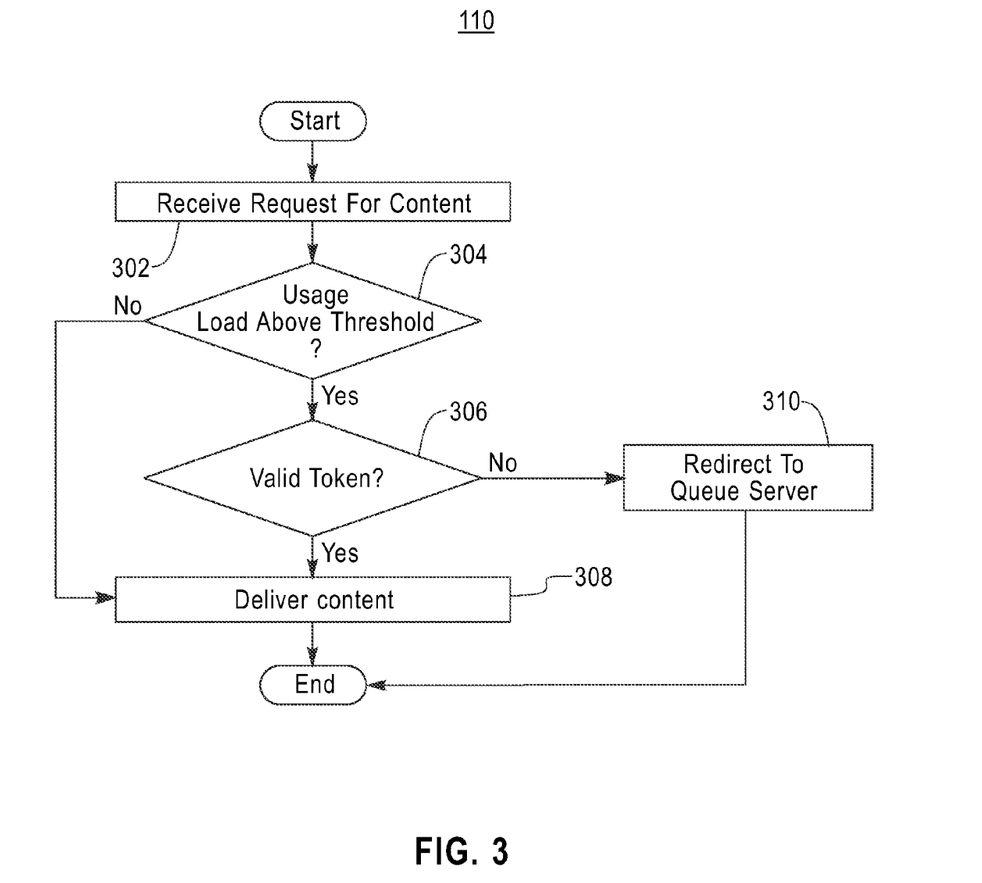
FIG. 3 is a flowchart depicting operational steps of a content program, on a content server computer within the distributed data processing environment of FIG. 1, for delivering web content, in accordance with an embodiment of the present invention.

FIG. 3 is a flowchart depicting operational steps of content program 110, on content server computer 108 within distributed data processing environment 100 of FIG. 1, for delivering web content, in accordance with an embodiment of the present invention.

Content program 110 receives a request for content (step 302). Content program 110 receives a request for web content from the user. The received request has been redirected to content program 110, from the user, through web request queue program 106.

Content program 110 determines whether the usage load of content server computer 108 is above a pre-defined threshold (decision block 304). While web request queue program 106 determines the whether the resource usage load of content server computer 108 is above the threshold based on the regularly received status, content program 110 determines whether the resource usage load of content server computer 108 is above the threshold at the time the user's request is received. If content program 110 determines the usage load of content server computer 108 is not above a pre-defined threshold ("no" branch, decision block 304), then content program 110 delivers the content to the user (step 308). Content program 110 processes requests without regard to position in the queue or token status when the resource usage load of content server computer 108 is below the pre-defined threshold.

If content program 110 determines the usage load of content server computer 108 is above a pre-defined threshold ("yes" branch, decision block 304), then content program 110 determines whether the request includes a valid token (decision block 306). Content program 110 compares the token embedded in the request as an HTTP header value and compares it to the valid tokens stored in database 112. As discussed above, web request queue program 106 issues tokens with a relatively short time duration for which the token is valid. If content program 110 determines that the token is valid ("yes" branch, decision block 306), then content program 110 delivers the content (step 308).

If content program 110 determines that the token is not valid ("no" branch, decision block 306), then content program 110 redirects the request to queue server computer 104 (step 310). If the token is not valid, for example, if the token has expired, then content program 110 redirects the user's request to queue server computer 104. The request is then processed by web request queue program 106, and positioned in the queue, per the flowchart depicted in FIG. 2. In one embodiment, if the token is not valid, content program 110 sends an error message to the user.

Figure 4:
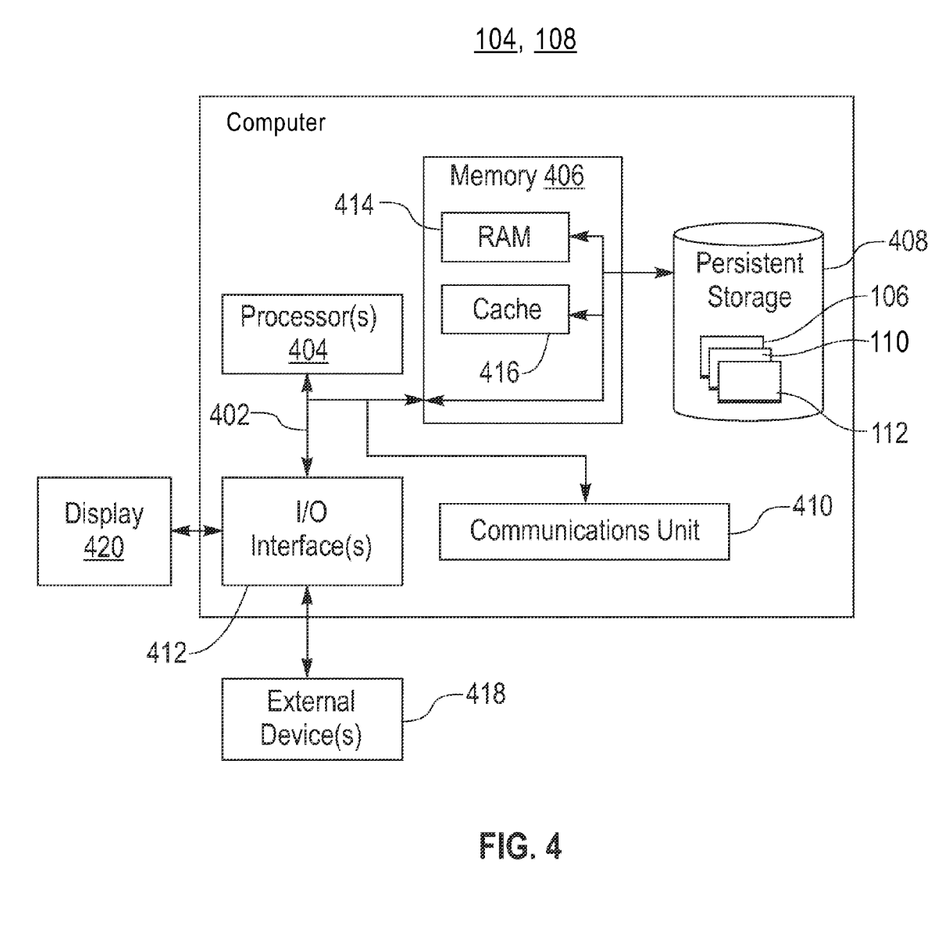
FIG. 4 depicts a block diagram of components of the queue server computer or the content server computer within the distributed data processing environment of FIG. 1, in accordance with an embodiment of the present invention.

FIG. 4 depicts a block diagram of components of queue server computer 104 or content server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Queue server computer 104 and content server computer 108 can each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 414 and cache memory 416. In general, memory 406 can include any suitable volatile or non-volatile computer readable storage media.

Web request queue program 106 is stored in persistent storage 408 for execution by one or more of the respective computer processor(s) 404 of queue server computer 104 via one or more memories of memory 406. Content program 110 and database 112 are stored in persistent storage 408 for execution and/or access by one or more of the respective computer processor(s) 404 of content server computer 108 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 114. In these examples, communications unit 410 includes one or more network interface cards. Communications unit 410 can provide communications through the use of either or both physical and wireless communications links. Web request queue program 106 can be downloaded to persistent storage 408 of queue server computer 104 through communications unit 410. Content program 110 and database 112 can be downloaded to persistent storage 408 of content server computer 108 through communications unit 410.

I/O interface(s) 412 allows for input and output of data with other devices that can be connected to queue server computer 104 and content server computer 108. For example, I/O interface(s) 412 can provide a connection to external device(s) 418 such as a keyboard, a keypad, a touch screen, a microphone, and/or some other suitable input device. External device(s) 418 can also include portable computer readable storage media such as, for example, thumb drives, portable optical or magnetic disks, and memory cards. Software and data used to practice embodiments of the present invention, e.g., web request queue program 106 on queue server computer 104, can be stored on such portable computer readable storage media and can be loaded onto persistent storage 408 of queue server computer 104 via I/O interface(s) 412. Software and data used to practice embodiments of the present invention, e.g., content program 110 and database 112 on content server computer 108, can be stored on such portable computer readable storage media and can be loaded onto persistent storage 408 of content server computer 108 via I/O interface(s) 412. I/O interface(s) 412 also connect to a display 420.

Display 420 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing requests to a high utilization website, the method comprising:
    receiving a first resource usage load status from a server computer;
    receiving a request for content on the server computer from a client device, the request for content is a Hypertext Transfer Protocol (HTTP) request;
    determining whether the first resource usage load status of the server computer is above a pre-defined threshold;
    establishing a bidirectional communication channel with the client;
    responsive to determining the first resource usage load status of the server computer is not above a pre-defined threshold, issuing respective instances of access tokens corresponding to the HTTP request for content to the server computer and to the client device;
    issuing a redirect with the access token to the client device, the redirect with the access token includes a uniform resource locater (URL);
        wherein the URL enables direct network communications between the client device and the server computer;
        wherein the access token is embedded in the HTTP request for content from the server computer; and
        wherein the HTTP request for content with the embedded access token is automatically retransmitted to the URL of the redirect; and
    transmitting the respective instances of the valid access tokens corresponding to the HTTP request for content to the first server computer and to the client device,
    wherein the steps are carried out by one or more computer processors.

2. The method of claim 1, further comprising:
    receiving a second resource usage load status from the server computer;
    responsive to determining the second resource usage load status of the server computer is not above the pre-defined threshold, issuing respective instances of valid access tokens corresponding to the HTTP request for content to the server computer and to the client device;
    issuing a redirect with the access token to the client device, the redirect with the access token includes a uniform resource locater (URL);
    transmitting the respective instances of the valid access tokens corresponding to the HTTP request for content to the first server computer and to the client device; and
    closing the bidirectional communication channel with the client device.

3. The method of claim 1, wherein establishing the bidirectional communication channel with the client device further comprises:
    establishing a WebSocket connection with the client device;
    transmitting one or more messages to the client device via the WebSocket connection, wherein at least one message is transmitted on a periodic basis to maintain the active WebSocket connection; and
    in response to issuing a redirect with the access token to the client device, closing the WebSocket connection with the client.

4. The method of claim 1, wherein the pre-defined threshold of resource usage load is a value of one or more of: a network bandwidth, a host processing power, a CPU usage percentage, an available memory, a file descriptor, a socket descriptor, a disk input/output bandwidth, a network traffic saturation, and a number of active requests for content.

5. A computer program product for managing requests to a high utilization website, the computer program product comprising:
    one or more computer readable storage media and program instructions stored on the one or more computer readable storage media, the program instructions comprising:
        program instructions to receive a first resource usage load status from a server computer;
        program instructions a request for content on the server computer from a client device, the request for content is a Hypertext Transfer Protocol (HTTP) request;
        program instructions to determine whether the first resource usage load status of the server computer is above a pre-defined threshold;
        program instructions to establish a bidirectional communication channel with the client;
        responsive to determining the first resource usage load status of the server computer is not above a pre-defined threshold, program instructions to issue respective instances of access tokens corresponding to the HTTP request for content to the server computer and to the client device;

program instructions to issue a redirect with the access token to the client device, the redirect with the access token includes a uniform resource locater (URL);
wherein the URL enables direct network communications between the client device and the server computer;
wherein the access token is embedded in the HTTP request for content from the server computer; and
wherein the HTTP request for content with the embedded access token is automatically retransmitted to the URL of the redirect; and
program instructions to transmit the respective instances of the valid access tokens corresponding to the HTTP request for content to the first server computer and to the client device.

6. The computer program product of claim 5, further comprising:
program instructions to receive a second resource usage load status from the server computer;
responsive to determining the second resource usage load status of the server computer is not above the pre-defined threshold, program instructions to issue respective instances of valid access tokens corresponding to the HTTP request for content to the server computer and to the client device;
program instructions to issue a redirect with the access token to the client device, the redirect with the access token includes a uniform resource locater (URL);
transmitting the respective instances of the valid access tokens corresponding to the HTTP request for content to the first server computer and to the client device; and
program instructions to close the bidirectional communication channel with the client device.

7. A computer system for managing requests to a high utilization website, the computer system comprising:
one or more computer processors;
one or more computer readable storage media;
program instructions stored on the one or more computer readable storage media for execution by at least one of the one or more computer processors, the program instructions comprising:
program instructions to receive a first resource usage load status from a server computer;
program instructions a request for content on the server computer from a client device, the request for content is a Hypertext Transfer Protocol (HTTP) request;
program instructions to determine whether the first resource usage load status of the server computer is above a pre-defined threshold;
program instructions to establish a bidirectional communication channel with the client;
responsive to determining the first resource usage load status of the server computer is not above a pre-defined threshold, program instructions to issue respective instances of access tokens corresponding to the HTTP request for content to the server computer and to the client device;
program instructions to issue a redirect with the access token to the client device, the redirect with the access token includes a uniform resource locater (URL);
wherein the URL enables direct network communications between the client device and the server computer;
wherein the access token is embedded in the HTTP request for content from the server computer; and
wherein the HTTP request for content with the embedded access token is automatically retransmitted to the URL of the redirect; and
program instructions to transmit the respective instances of the valid access tokens corresponding to the HTTP request for content to the first server computer and to the client device.

8. The computer system of claim 7, further comprising:
program instructions to receive a second resource usage load status from the server computer;
responsive to determining the second resource usage load status of the server computer is not above the pre-defined threshold, program instructions to issue respective instances of valid access tokens corresponding to the HTTP request for content to the server computer and to the client device;
program instructions to issue a redirect with the access token to the client device, the redirect with the access token includes a uniform resource locater (URL);
transmitting the respective instances of the valid access tokens corresponding to the HTTP request for content to the first server computer and to the client device; and
program instructions to close the bidirectional communication channel with the client device.

9. The method of claim 1, further comprising:
managing the request for content from the server computer, by the client device, based on issuing access tokens;
wherein an instance of an access token, corresponding to the HTTP request for content is associated with the client device; and
wherein another instance of the access token, corresponding to the HTTP request for content, is associated with the server computer for storage within a database of the server computer.

10. The method of claim 9, wherein access tokens are one-time access tokens, and wherein a one-time access token associated with the server computer is stored within the database of the server computer and expires after a duration of time.

11. The method of claim 2, wherein issuing a redirect with the access token to the client device further comprises:
transmitting, to the client device, the access token corresponding to the HTTP request for content from the server computer and the URL of the redirect:
wherein the URL enables direct network communications between the client device and the server computer;
wherein the access token is embedded in the header of the corresponding HTTP request for content at the client device; and
wherein the client device automatically retransmits the corresponding HTTP request for content with the embedded access token to the transmitted URL of the redirect.

12. The computer program product of claim 5, further comprising:
program instructions to manage the request for content from the server computer, by the client device, based on issuing access tokens;
wherein an instance of an access token, corresponding to the HTTP request for content is associated with the client device; and
wherein a another instance of the access token, corresponding to the HTTP request for content, is associated with the server computer for storage within a database of the server computer.

13. The computer program product of claim 12, wherein access tokens are one-time access tokens, and wherein a one-time access token associated with the server computer is stored within the database of the server computer and expires after a duration of time.

14. The computer program product of claim 6, wherein program instructions to issue a redirect with the access token to the client device further comprises:
   program instructions to transmit, to the client device, the access token corresponding to the HTTP request for content from the server computer and the URL of the redirect:
      wherein the URL enables direct network communications between the client device and the server computer;
      wherein the access token is embedded in the header of the corresponding HTTP request for content at the client device; and
      wherein the client device automatically retransmits to the corresponding HTTP request for content with the embedded access token to the transmitted URL of the redirect.

15. The computer system of claim 7, further comprising:
   program instructions to manage the request for content from the server computer, by the client device, based on issuing access tokens;
      wherein an instance of an access token, corresponding to the HTTP request for content is associated with the client device; and
      wherein a another instance of the access token, corresponding to the HTTP request for content, is associated with the server computer for storage within a database of the server computer.

16. The computer system of claim 15, wherein access tokens are one-time access tokens, and wherein a one-time access token associated with the server computer is stored within the database of the server computer and expires after a duration of time.

17. The computer system of claim 8, wherein program instructions to issue a redirect with the access token to the client device further comprises:
   program instructions to transmit, to the client device, the access token corresponding to the HTTP request for content from the server computer and the URL of the redirect:
      wherein the URL enables direct network communications between the client device and the server computer;
      wherein the access token is embedded in the header of the corresponding HTTP request for content at the client device; and
      wherein the client device automatically retransmits the corresponding HTTP request for content with the embedded access token to the transmitted URL of the redirect.

\* \* \* \* \*